April 4, 1939.  B. WHITIS  2,153,489

RELEASING DEVICE FOR ARTIFICIAL OR NATURAL FISHING BAIT

Filed April 10, 1934

Bee Whitis, INVENTOR

BY Victor J. Evans & Co.
ATTORNEY

WITNESS:

Patented Apr. 4, 1939

2,153,489

UNITED STATES PATENT OFFICE 2,153,489

RELEASING DEVICE FOR ARTIFICIAL OR NATURAL FISHING BAIT

Bee Whitis, Pikeville, Ky.

Application April 10, 1934, Serial No. 719,949

1 Claim. (Cl. 43—30)

This invention relates to a releasing device for artificial or natural fishing bait and has for its primary object the provision of a device of the above stated character to deliver a direct hammer blow in through the longitudinal axis of the hook or hooks, especially adaptable for use in fishing to aid a person in releasing or dislodging the bait from engagement with an object acting to restrain the pulling or drawing in of the fishing line and is extremely advantageous to a person casting for a strike by fish, wherein the bait or a hook in or on the bait catches in an object, either within or out of the water.

With this and other objects in view, this invention consists of certain novel features of construction, combination and arrangement of parts to be hereinafter more fully described and claimed.

For a complete understanding of my invention, reference is to be had to the following description and the accompanying drawing, in which Figure 1 is a longitudinal sectional view illustrating a releasing device for artificial and natural fishing bait and constructed in accordance with my invention and showing the device in normal position.

Figure 8:
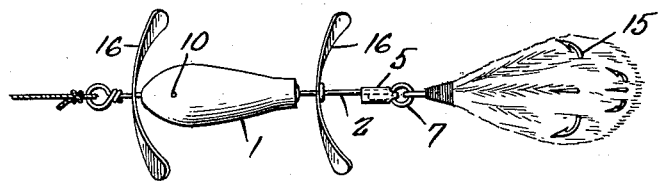
Figure 8 illustrates a modified form of my invention wherein spinners are shown in connection with my invention.

Referring in detail to the drawing, it will be seen that this invention is employed between a fishing line and a hook or artificial bait, or as a part of an artificial bait as illustrated in Figure 8, for the purpose of aiding a person in releasing a hook or artificial bait from an obstacle when hung therein, by delivering a direct hammer blow through the longitudinal axis thereof, in the opposite direction to which the hook or bait was being drawn when hung.

This invention consists of a round elongated body 1 centrally bored from the rear end to contain a compression spring 3 positioned around a rod 2, the latter being slidably supported within the bore of the body 1 by a hollow screw 4 and has a cylindrical head 6. All of the parts are made of a non-corrosive metallic substance.

The body 1 is larger in circumference near the forward end and tapers toward the rear end in order to resemble the body of a bug or minnow, said body to be decorated on its exterior surface in a life-like manner. On the forward end is an extension 9, the end of which is bent and wrapped upon itself to form an eye 11, to which a swivel, fishing line or leader may be attached. The rear portion of the bore or chamber in body 1 is threaded to receive the screw 4, and the forward end of the bore or chamber has four openings or vents 10 leading from the interior to the exterior surface of the said body, in order to allow water to escape when the device is in action under water.

The cylindrical rod 2 has on its forward end the cylindrical head 6, the purpose of which is to compress the spring 3 and to receive the hammer blow of body 1 when in action. The rear end of said rod 2 is bent upon itself to form an eye 7, terminating in a shank 12 which parallels a portion of the rod 2. Any kind of artificial bait or a hook for live bait may be readily applied to the eye 7 by passing the eye of the hook or artificial bait over the shank 12. A sleeve 5 is slidably mounted on the rod 2 and engages over the shank 12 to close the eye 7 and prevent the displacement of the hook or artificial bait from said eye 7. One end of the sleeve 5 has a resilient tongue 13 adapted to snap in the eye 7 for holding one end of the sleeve in engagement with said eye 7 and also to retain the sleeve in a position to overlie the shank 12.

Figure 1:
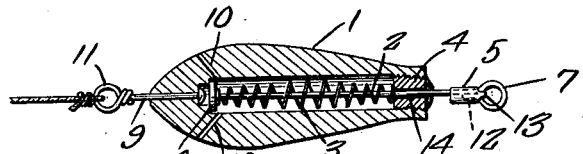
Figure 2:
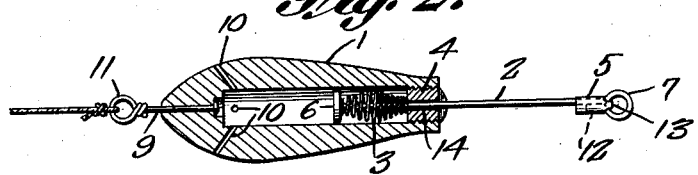
Figure 2 is a longitudinal sectional view of the device when in action ready to deliver the direct hammer blow.
Figure 3:
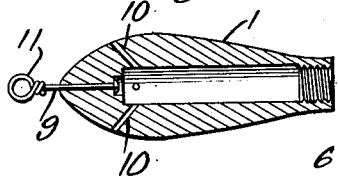
Figure 3 is a longitudinal sectional view illustrating the body of the device.
Figures 4, 5:
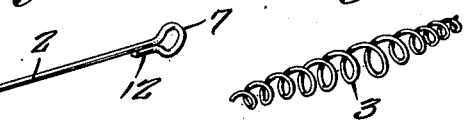
Figure 4 is a perspective view illustrating the plunger of the device.
Figure 5 is a perspective view illustrating a spring for the plunger.
Figure 6:
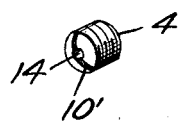
Figure 6 is a perspective view illustrating a screw or bearing for slidably supporting the plunger in the body.
Figure 7:
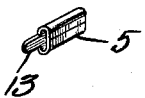
Figure 7 is a perspective view illustrating a clip.

The coiled compression spring 3 is interposed on the rod 2 between screw 4 and the cylindrical rod head 6. Each end of said spring 3 is closed, in order to maintain the correct relationship between the different members. When the hook or artificial bait catches into an object, a pull on the line causes the body 1 to withdraw from the cylindrical rod head 6 and to compress the spring 3 as in Figure 2. Upon a quick release of the line the action of spring 3 forces the body 1 forward with a hammer-like blow against the head 6, which blow is transmitted through rod 2 to the hook or artificial bait with much force, thereby driving said hook or artificial bait in a direction to dislodge it from the object.

The headless screw 4 has a central bore 14 to permit the rod 2 to slide freely and has a slot 10 to facilitate removal of said screw 4, thus making all parts of my invention readily accessible.

Referring to Figure 8, it will be seen that the rod 2 has connected thereto a group of feather-covered hooks 15 and the rods 2 and 9 have journaled thereon spinners 16, the body 1 being interposed between said spinners giving this type of artificial bait the advantage of my invention while the body takes the place of the usual weights or shots located between the spinners.

Having described the invention, I claim:

The combination with a fishing line and hook having a shank rigid therewith, of means interposed between the hook shank and line to jar the hook loose from any obstruction on which it may be caught in casting, said means comprising a member having a single universal connection with the shank at the end remote from the hook and embodying a light plunger rod rigidly connected at one end with said member, a plunger connected with the rod at the opposite end, a body member formed with an internal bore traversed by said plunger and closed at its opposite ends through one of which the plunger rod slidably passes, a compression spring disposed in the bore in surrounding relation to the plunger rod and bearing one end on the plunger and the other end on that extremity of the bore through which the rod passes, and means connecting the line to the body member at the opposite end from the plunger rod, whereby, upon engagement of the hook with an obstruction, a pull on the line may retract the body member so that on quick release of the line it may engage the plunger with a sudden impact to dislodge the hook.

BEE WHITIS.